July 2, 1963  A. R. BONE  3,095,807
INDICIA-APPLYING MACHINE
Filed April 14, 1960  13 Sheets-Sheet 1

INVENTOR.
Arnold R. Bone
BY
Roberts, Cushman & Grover
ATT'YS

July 2, 1963 — A. R. BONE — 3,095,807
INDICIA-APPLYING MACHINE
Filed April 14, 1960 — 13 Sheets-Sheet 3

INVENTOR.
Arnold R. Bone
BY
Roberts, Cushman & Grover
ATT'YS.

July 2, 1963
A. R. BONE
3,095,807
INDICIA-APPLYING MACHINE
Filed April 14, 1960
13 Sheets-Sheet 4
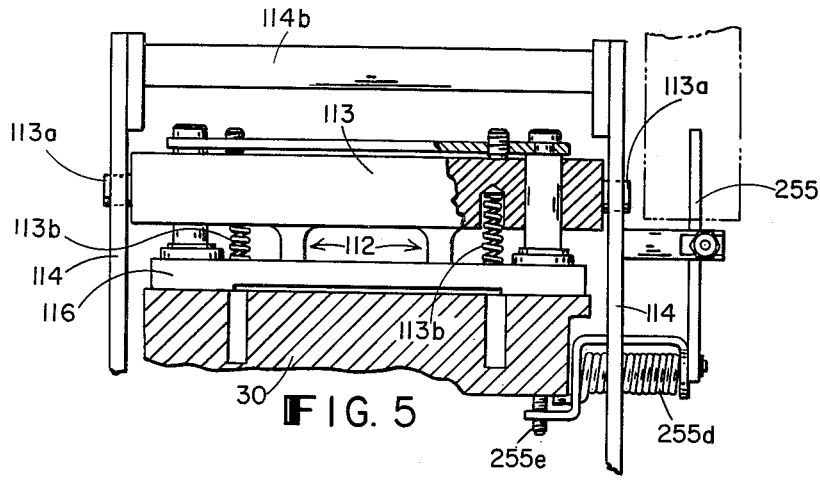
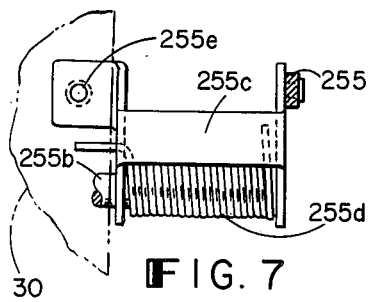
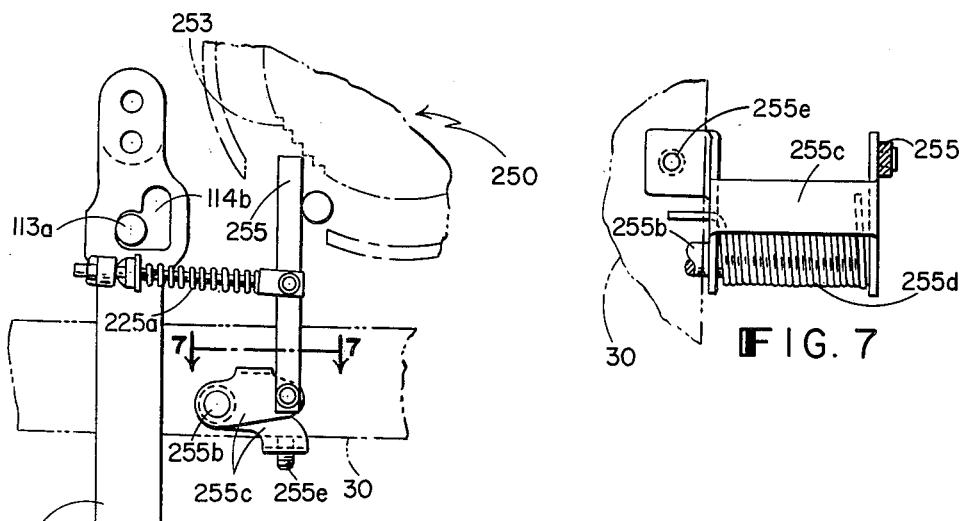
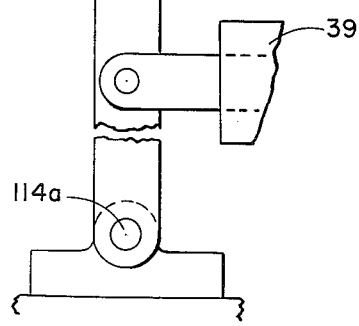
INVENTOR.
Arnold R. Bone
BY
Roberts, Cushman & Grover
ATT'YS.

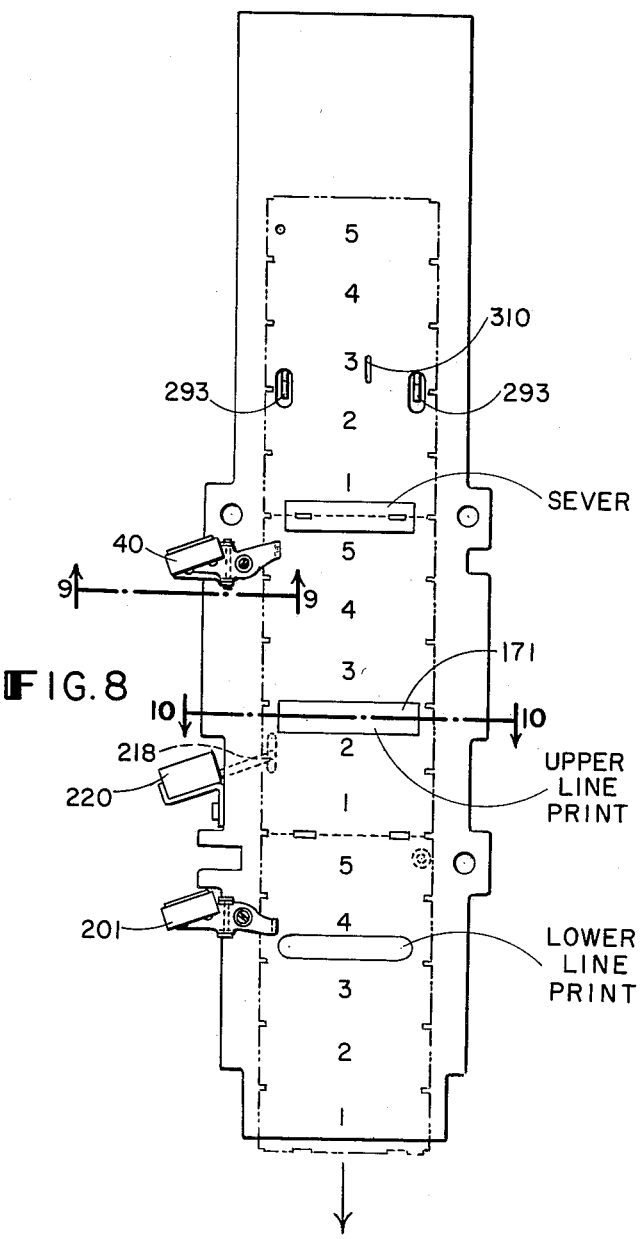

July 2, 1963          A. R. BONE          3,095,807
INDICIA-APPLYING MACHINE
Filed April 14, 1960          13 Sheets—Sheet 6

INVENTOR.
Arnold R. Bone
BY
Roberts, Cushman & Grover
ATT'YS.

July 2, 1963
A. R. BONE
3,095,807
INDICIA-APPLYING MACHINE
Filed April 14, 1960
13 Sheets-Sheet 9
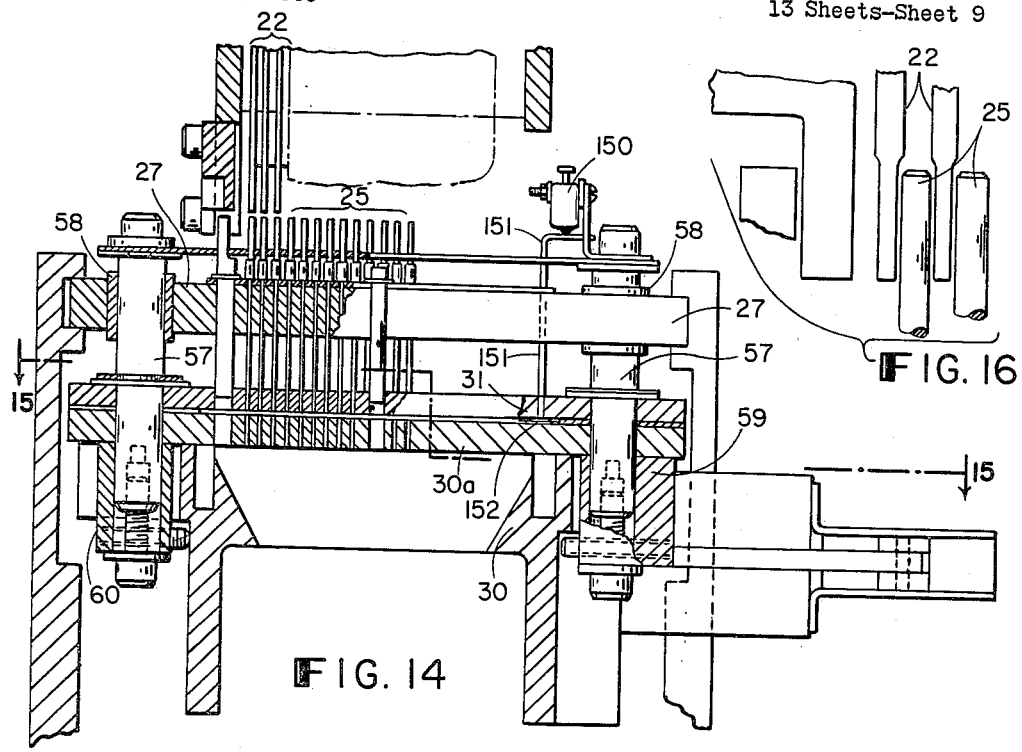
FIG. 14
FIG. 16
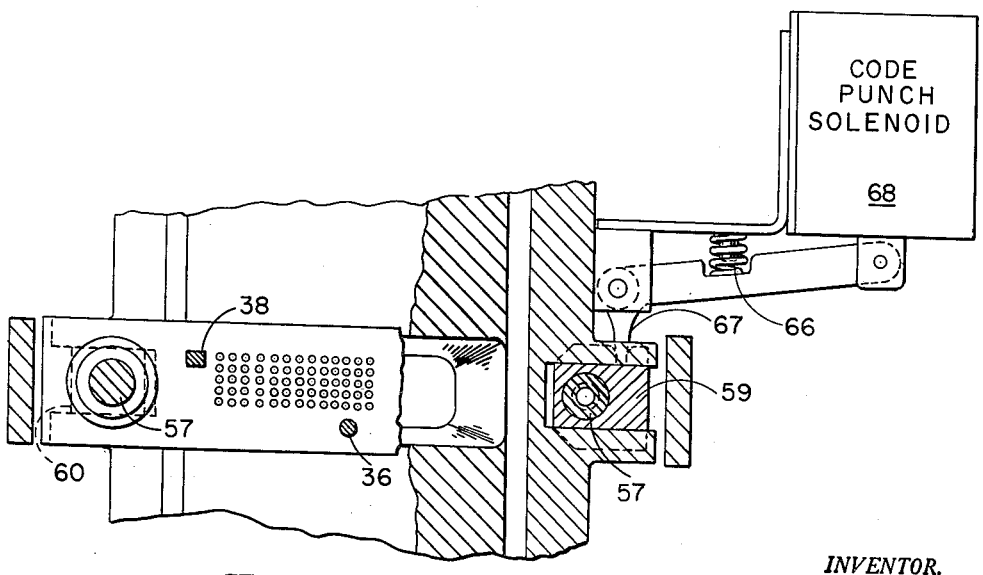
FIG. 15
INVENTOR.
Arnold R. Bone
BY
Roberts, Cushman & Grover
ATT'YS.

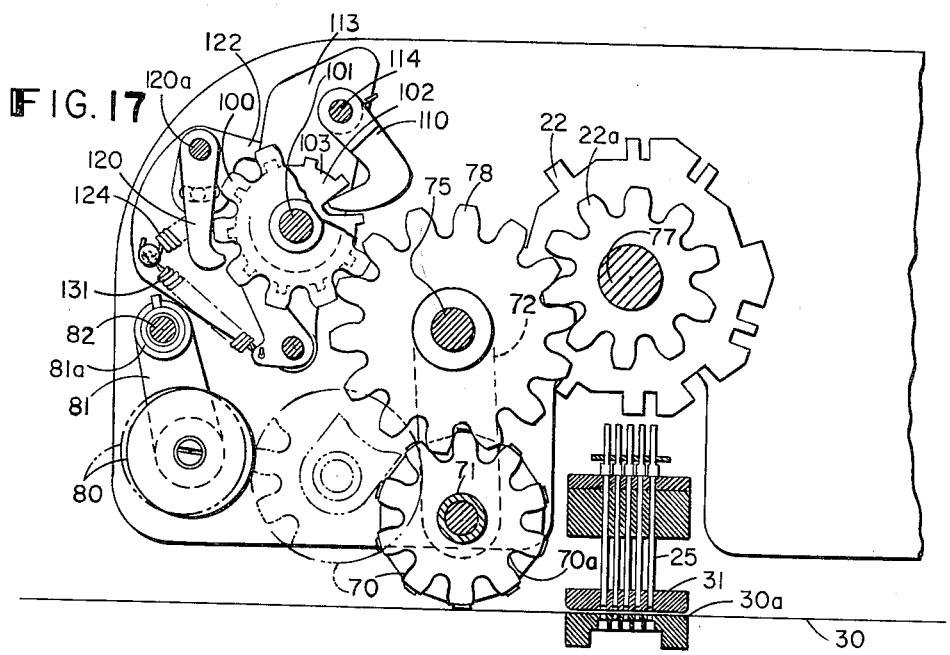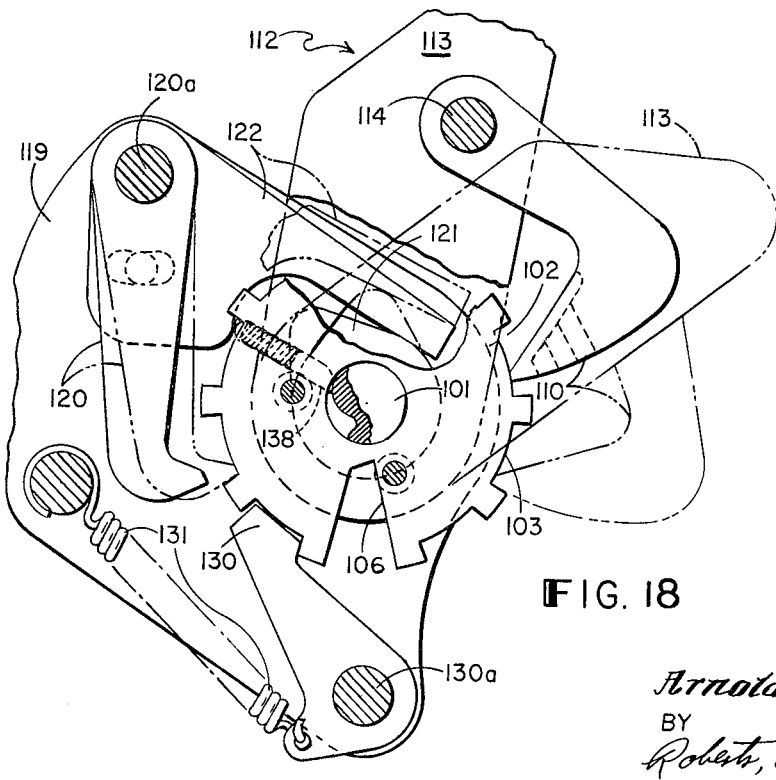

July 2, 1963

A. R. BONE 3,095,807

INDICIA-APPLYING MACHINE

Filed April 14, 1960

INVENTOR.
Arnold R. Bone
BY
Roberts, Cushman & Grover

ATT'YS.

July 2, 1963     A. R. BONE     3,095,807
INDICIA-APPLYING MACHINE
Filed April 14, 1960     13 Sheets-Sheet 12
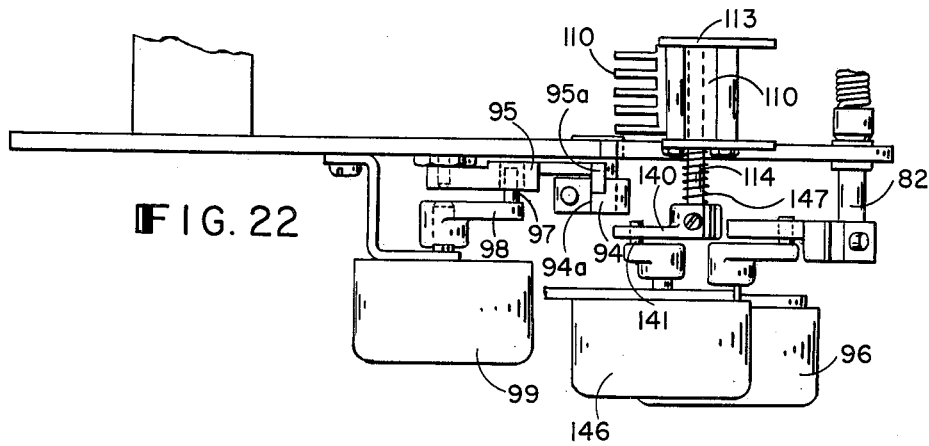
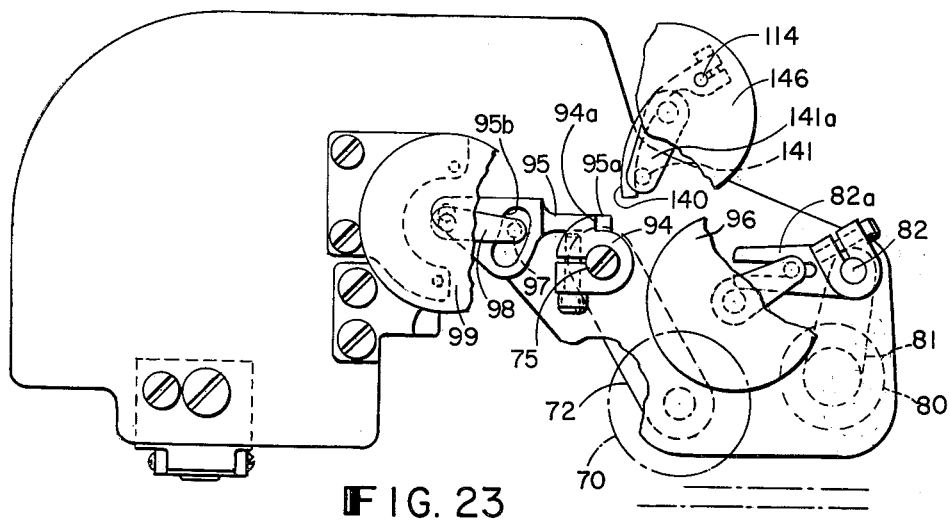
INVENTOR.
*Arnold R. Bone*
BY
*Roberts, Cushman & Grover*
ATT'YS.

United States Patent Office 3,095,807
Patented July 2, 1963

3,095,807
INDICIA-APPLYING MACHINE
Arnold R. Bone, Needham, Mass., assignor to Dennison Manufacturing Company, Framingham, Mass., a corporation of Massachusetts
Filed Apr. 14, 1960, Ser. No. 22,361
7 Claims. (Cl. 101—19)

This invention relates to an indicia-applying machine for printing and punching sectional ticket material. The machine is of the general type shown in United States Patent No. 2,890,650 and in the applications of Donald D. Sloan and Alan M. Swett, Serial No. 740,342, now Patent No. 3,036,519, and Arnold R. Bone, Serial No. 740,386, now Patent No. 3,036,570, both filed June 6, 1958.

The machines disclosed in the said patent and applications are organized to advance sectional ticket material in steps past three indicia-applying devices. In a given machine cycle the ticket material is advanced one step, one section is punched in code at one station and two other sections are printed at two other stations, some or all of the printed data being reproduced in the code punching. At any one of these three stations, so long as ticket material is present the action in any cycle is the same as in other cycles, except that in the improved machine of said applications the printing of numbers at one station and the punching of the same indicia in code may be progressively automatically advanced.

Thus the several ticket sections of a given complete ticket do not differ in the design or layout of indicia that they carry.

Sectional ticket material is generally preprinted with invariable information, the machines of the above applications then serving to apply the variable information. However, the effectiveness of use of preprinting is limited by the appearance upon every ticket section of all of the variable information that is printed and punched by the various devices of such a machine. Preprinting could be obscured by code punching, or could be obscured by printed indicia. Since this should not occur, the practice is generally to restrict preparing to areas that the device will neither print nor punch. In any case the area occupied by the variable printed and punched indicia is not suited to serve as a form to receive notations or the like.

The present invention is concerned with the suppression of printing and punching operations with respect to selected sections of the ticket, so as to leave free space for other uses, such as to carry preprinted invariable indicia, or to receive a subsequently applied record or notation. This results in a ticket, the design or layout of whose various sections varies, depending upon whether the particular section is or is not acted on by one or more of the indicia-applying devices.

Among the objects of the invention are to suppress and permit operation of the indicia-applying devices according to a predetermined pattern and to prevent the operation of the machine with the ticket material out of phase with respect to the intended pattern of operation and non-operation of the indicia-applying devices.

Other objects and advantages of the invention will be apparent from this specification and its accompanying drawings.

Figure 1:
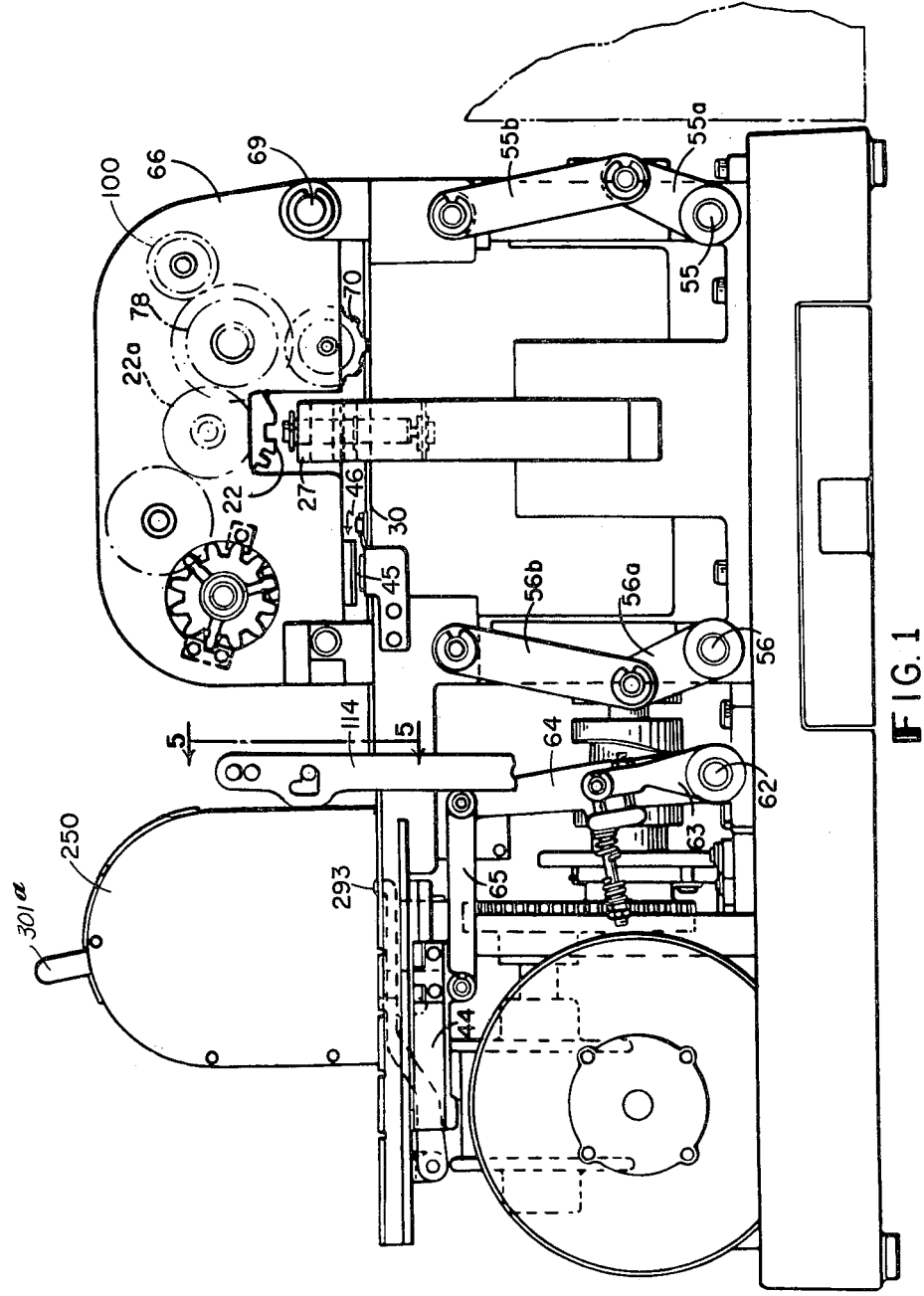
FIG. 1 is a left side elevation of a machine according to the present invention.
Figure 9:
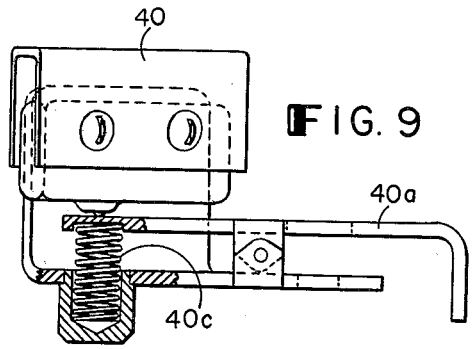
Figure 4:
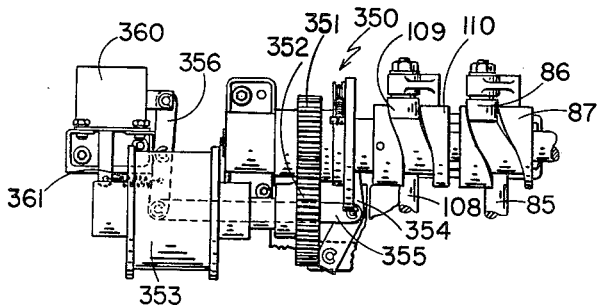
Figure 11:
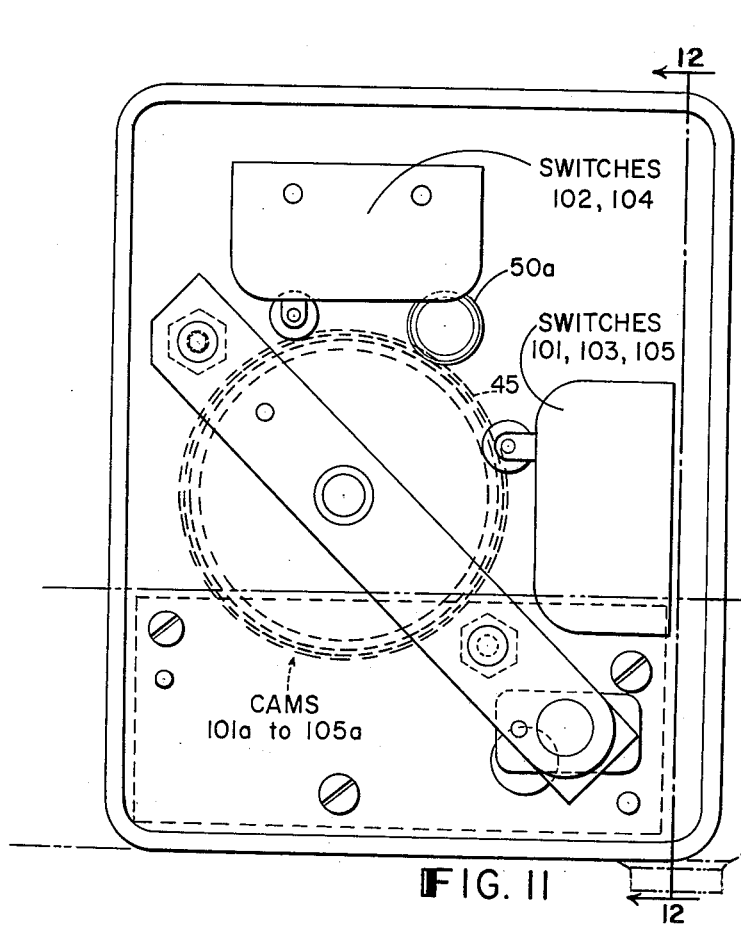
Figure 10:
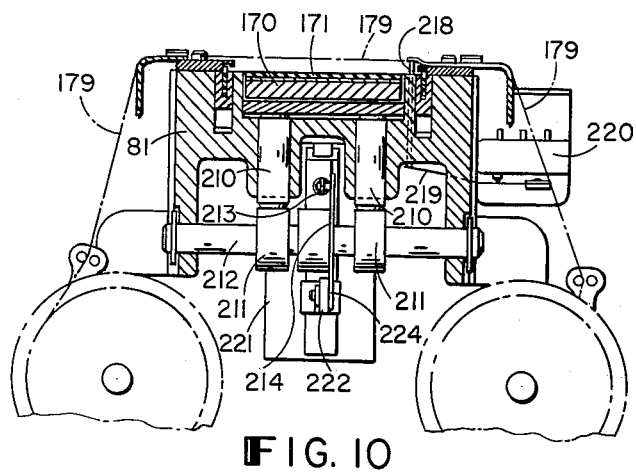
Figure 12:
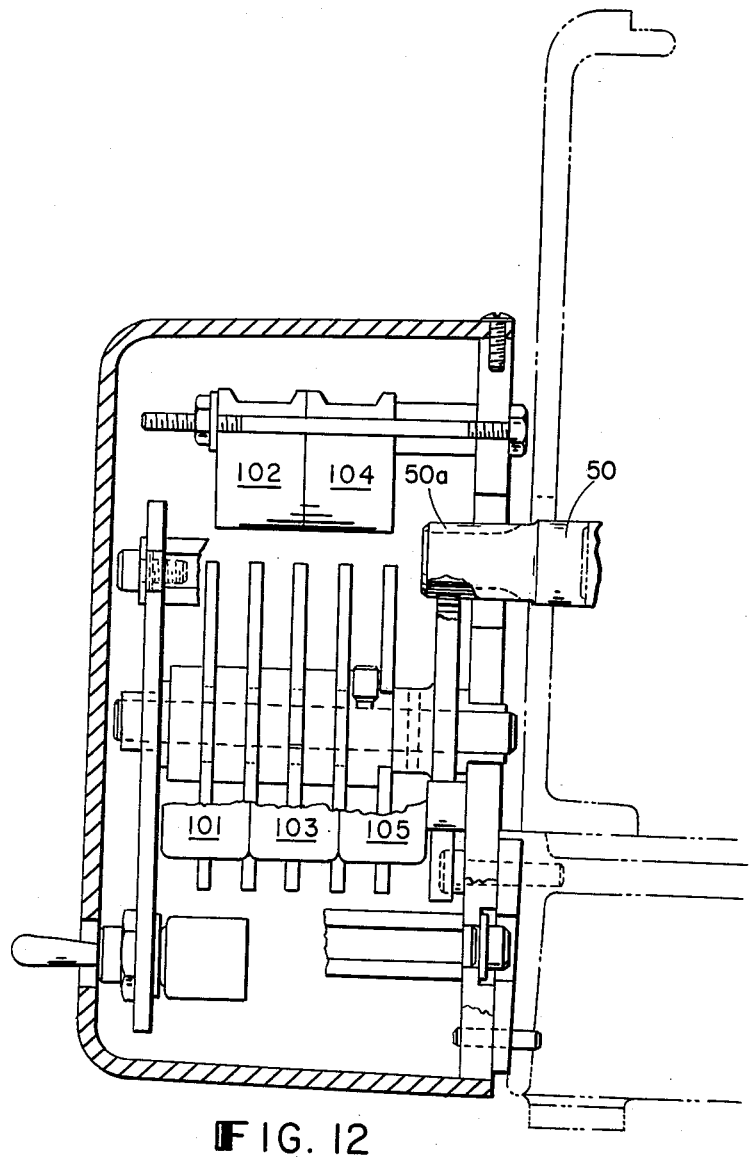
Figure 13:
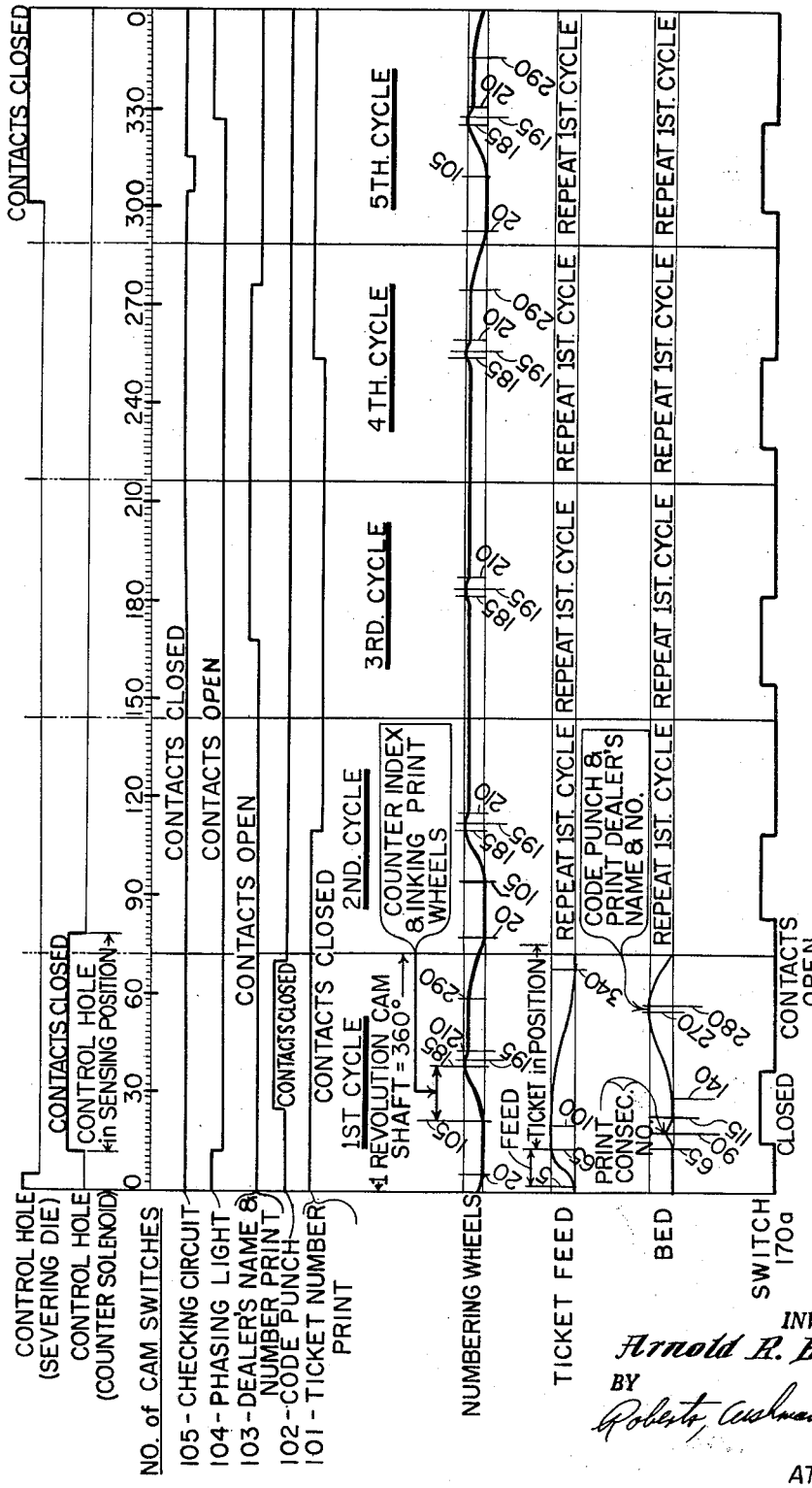

FIG. 4, corresponding in part to FIG. 6 of Patent No. 2,890,650, is a plan view of portions of the machine with numerous parts omitted;

FIG. 5 is a view showing the severing dies, mainly along the section line 5—5 of FIG. 1;

FIG. 6 is a view taken from the right side of FIG. 5 showing the mechanism for controlling the severing dies and counter;

FIG. 7 is a horizontal sectional view taken on the line 7—7 of FIG. 6;

FIG. 8 is a diagrammatic view in the nature of a plan view showing the bed and the location of the various stations and detecting devices and also diagrammatically showing the entering ticket strip and two five-section tickets severed therefrom;

FIG. 9 is a fragmentary view taken on the line 9—9 of FIG. 8 showing one of the sensing switches;

FIG. 10 is a fragmentary sectional view through the platen of the first or upper line printing station, showing platen release mechanism;

FIG. 11 is an end view of a group of five cam-operated switches for timing various of the operations of the machine;

FIG. 12 is a view of the mechanism of FIG. 11 taken on the line 11—11 of FIG. 12;

FIG. 13 is a timing diagram of the machine;

FIG. 14 is a vertical cross sectional view through the punching station;

FIG. 15 is a diagrammatic view partly in plan and partly in horizontal section showing mechanism for shifting the bank of punches into and out of operative position;

FIG. 16 is an enlarged view showing certain of the punches in their inoperative positions relative to their interposers.

Figure 20:
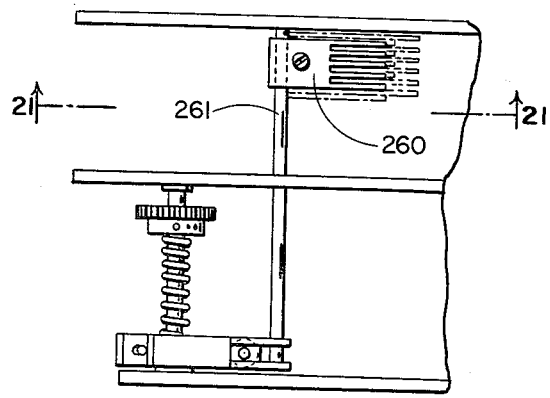
Figure 21:
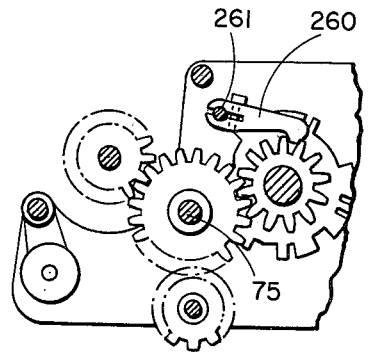
Figure 19:
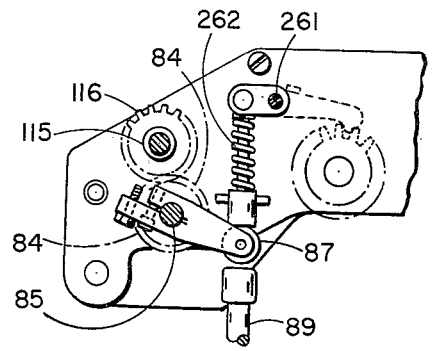
Figure 24B:
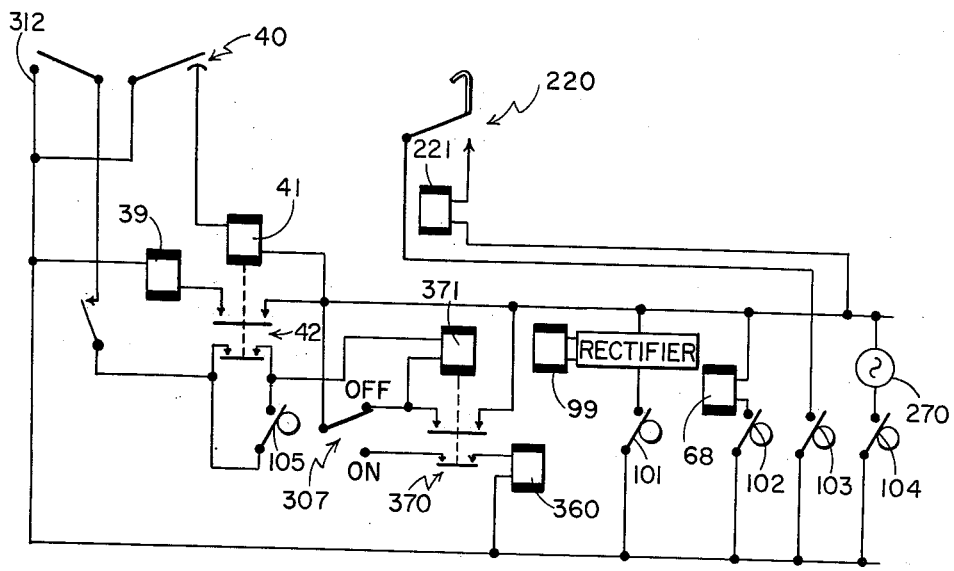
Figure 24A:
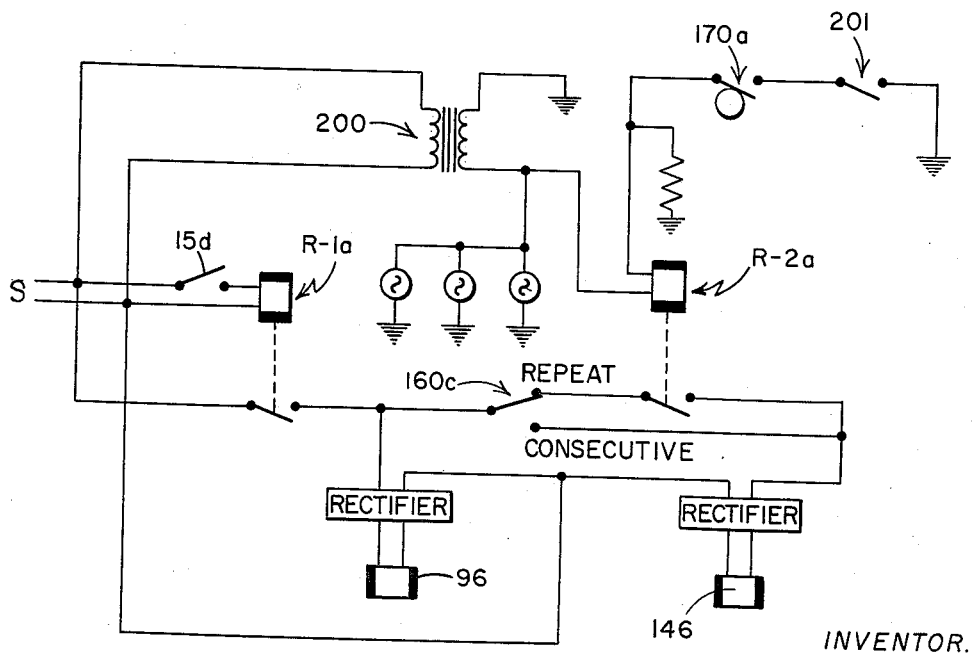

FIG. 17 is a diagrammatic view of the lower line printing mechanism, the setting-changing mechanism and inking mechanism of said Bone application and this present application;

FIG. 18 is a diagram on a larger scale than FIG. 17 of portions of the drive mechanism for the counter, and in particular the counter drive pawl, one of the drive rings driven by this pawl, a stop pawl for the drive rings, a cam for operating the stop pawl and a detent pawl;

FIG. 19 is a diagrammatic view showing the connections for operating the interposer comb;

FIG. 20 is a plan view of the mechanism of FIG. 19;

FIG. 21 is a vertical sectional view taken on the line 21—21 of FIG. 20 showing additionally the connections by which one of the interposers is advanced;

FIGS. 22 and 23, which are fragmentary views respectively in plan and in side elevation, show connections for operating the setting-changing pawl and controlling the ink roll like those of the Bone application, but by use of rotary instead of reciprocatory solenoids. These views also show means additional to the structure of the Bone application for latching the numbering wheels in an elevated inactive position and for releasing the latch;

FIG. 24a shows in a simplified manner that part of the circuitry of the machine that is generally similar to the circuitry of FIG. 16 of the Bone application, for controlling the setting-changing and inking.

FIG. 24b shows in a simplified manner that part of the circuitry that modifies the clutch control circuit of FIG. 6 of the patent to Swett No. 2,850,208 so as to condition the operation of the machine upon proper phasing, and also shows means for automatically controlling the severing die and counter, the printing and non-printing at the upper and lower line printing stations, and the punching and non-punching in various cycles, and also for indicating the completion of each five cycle sequence.

Figure 3:
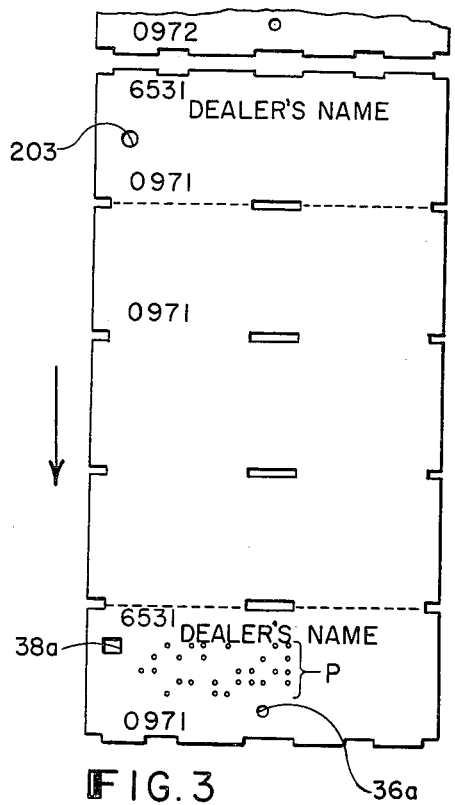
FIG. 3 is a face view of a completed ticket, this view omitting the preprinting in order more clearly to illustrate the variable information that may be applied in the machine.

FIG. 3 illustrates a ticket which can be produced by the machine of this invention. As shown the ticket comprises five equal-size sections demarked by edge feed slots which receive the reciprocating feed pawls of the machine. All "preprinting" is omitted in this illustration, only that printing which is performed on the present machine being shown.

Referring to the sections by number, in the order in which they lie from bottom to top of this FIG. 3, it will be seen that the first and fifth sections are to carry a dealer's name and an adjacent code number representing that dealer. This is what might be called variable information in that it will vary from lot to lot of the tickets.

Certain of the punching P in the first section corresponds to this code number representing the dealer's name.

Then it will be noted that at the bottom of each of the first, fourth and fifth sections there appears a ticket number. This will ordinarily be peculiar to the individual ticket, the numbers of the tickets of a given run being progressively higher as indicated by the consecutively higher number on the illustrated fragment of the next successive ticket. A portion of the punching P in the first section corresponds to the ticket's number. Along with the punching P in the first section, two locating holes 36a and 38a are punched to insure proper location of this section of the ticket when the punching is automatically read by a reading or interpreting device.

It will be seen that the punching P and the locating holes 36a and 38a are not repeated in any other section. Further it will be seen that sections 2 and 3 carry no printing or punching and that section 4 carries only the ticket number. Thus there is ample room in sections 2 to 5 for preprinting and for the receipt of further notations after the printing and punching of the tickets in the machine of this invention.

This design of ticket of course requires that these differently designed sections shall appear in the intended order. Thus if the design of ticket of FIG. 3 is adopted, it would not do to let a ticket start with what is intended to be section 2 rather than section 1.

The machine includes a bed 30 adapted to receive sectional ticket material and reciprocable up and down to cause the material to be acted on by printing and punching devices in a stationary head.

The main shaft 50 (FIG. 2) is driven by a motor 51 through a clutch 351 which is held in engagement by a solenoid 360 as in United States Patent No. 2,890,650.

Shaft 50, through cams 53, 54, rocks cross shafts 55, 56 which as shown in FIG. 1 operate toggles 55a, 55b and 56a, 56b to raise and lower the bed. Another cam 60 operates a rock shaft 62 which acts through suitable linkages 63, 64 and 65 to reciprocate a feed slide 44 which operates slide bars carrying pawls which engage in the side feed slots of the ticket material as in said patent and applications. The ticket material is fed from left to right in FIG. 1 in successive steps equal in length to the length of a ticket section.

Although various aspects of this invention are applicable to tickets which have already been severed from a strip, the particular machine here illustrated includes means for severing the tickets from a continuous strip.

This severing means is generally similar to the severing means shown in FIGS. 8 and 9 of United States Patent No. 2,890,650. Severing dies 112 carried by a die carrier 113 extend through openings in a plate 116 which overlies the ticket material on the bed. When the bed rises, the die carrier being held down, the dies are forced through the ticket material. It will be understood that the ticket material will have already been cut or slitted across its width except at narrow uncut portions which are severed by the dies to detach the ticket from the strip.

Unlike the severing mechanism of Patent No. 2,890,650 the severing mechanism of the present machine does not work invariably at each cycle.

The vertical bars 114 which are adapted to hold the carrier down as the bed moves up are pivoted at their bottoms at 114a (FIG. 6) and are tied together at the top by a cross connection 114b. Projections 113a extend from the die carrier 113 into slots 114c in the bars 114. As shown, these slots have a low side and a high side. A spring 114d normally holds the bars 114 in position for the projections 113a to occupy the high sides of the slots. In this position the bars do not hold the die carrier 113 down. The die carrier 113 is yieldingly supported by springs 113b. Thus the die carrier can rise with the bed and the dies not penetrate the ticket material. A solenoid 139, when actuated, when the bed is down, moves the bars 114 to the position of FIG. 6. In this position the die carrier is held down so that the dies are effective as the bed rises.

The machine includes a settable counter 250 which operates mechanism to lift the ticket material above the initial feed pawls and subsequently open a switch 307 to deenergize the clutch solenoid 360 substantially as shown and described in connection with FIGS. 24 to 30 inclusive of Patent No. 2,890,650, except for the control of the counter-actuating member 255. In the present machine this actuating member is connected by a yielding connection 255a to one of the swinging bars 114 so that member 255 is moved into operative relation to the ratchet teeth 253 by movement of the bar 114 to the severing position of FIG. 6. The motion of the bed is communicated to the counter-actuating member 255 through a pin 255b carried by the bed and a bracket 255c pivoted on the pin. A coil spring 255d interposed between the bed and the bracket 255c, can yield to prevent jamming, and an adjustable stop bolt 255e carried by the bracket can adjust the normal relation of the bracket and bed.

Referring to FIG. 8, in advance of the strip severing station a detector 310 is held down by the entering ticket strip and when thus held down acts to close a normally open limit switch 312 as in said patent. Reference to the wiring diagram, FIG. 24b, will show that when this switch 312 opens, upon absence of the ticket material, the coil 371 of an automatic switch or relay 370 is deenergized which in turn deenergizes the clutch solenoid 360 to stop the machine. Adjacent to the detector 310, lifter fingers 293 operated by the counter as in said patent (see particularly FIGS. 27a, 29 and 30 of the patent) are adapted to lift the strip above the path of the two rearmost feed pawls to shut off supply of the strip when the predetermined count is reached. It may be noted here that the lifting of the strip by fingers 293 still allows the ticket strip to hold the detector 310 sufficiently depressed to maintain the switch 312 closed, so that this means of discontinuing the supply of ticket strip does not stop the machine, which continues to feed the severed tickets through the machine.

At the first ticket position beyond the severing dies a sensing switch 40 is provided. This switch includes a pivotally mounted operating element 40a whose turned-down right hand end (FIG. 9) is of a size adapted to enter a sensing hole 203 of a ticket section, and which is yieldingly urged downward by a compression spring. This sensing switch is open when the right end of the actuating element is supported by ticket material, but is closed by the action of spring 40c when the right-hand end is unsupported by ticket material, as when a hole 203 is encountered or there is a complete absence of ticket material at this first ticket position.

As will be seen from the wiring diagram (FIG. 24b) closure of this sensing switch energizes the operating coil 41 of a relay 42, the upper contacts of which then complete a circuit through the severing die solenoid 39. Since the ticket strip contains such a sensing hole 203 in each fifth section, the strip will be severed into five-section tickets, and since the counter 250 is actuated at the time of severing, the tickets will be correctly counted.

At the fourth ticket position beyond the severing dies the ticket section lies upon a printing platen 170 having a rubber pad 171 which is overlain by the usual ink ribbon, substantially as shown in FIG. 19 of Patent No. 2,890,650.

Above the ink ribbon, the head of the machine carries a printing plate 45, detachably held by a printing plate holder 46. In the form of device shown, the printing plate holder holds the printing plate by magnetic action, the holder 46 being permanently magnetized. This printing plate will generally carry indicia which is variable in the sense that it will be changed by substituting a different plate for each batch of tickets printed and in the example given this plate will carry a dealer's name and a code number corresponding thereto.

The printing platen 170 is adapted to be raised relative to the bed by plungers which are raised by underlying cams fast on a shaft which is rotated by a crank movable by a solenoid 221. The arrangement of the cams is such that energization of the solenoid raises the platen.

The platen and the printing plate are so arranged relative to each other that when the solenoid is deenergized and the platen is in its released position the upward movement of the bed will not force the ticket against the ink ribbon which is then in contact with the printing plate, and no print will be made. However, with the solenoid energized, and the platen raised, a print will be made.

The solenoid 221 is energized by closing of a sensing switch 220 by a detector 218 being forced down by ticket material at this station generally as in Patent No. 2,890,650. A flat spring-like element 219 is depressed by the detector 218 to close switch 220. However in the present machine the platen solenoid is under the additional control of a cam operated switch 103 which operates in timed relation to the machine to suppress the printing operation on the second, third and fourth sections of each ticket.

Cam operated switch 103 is one of five similar normally open switches 101 to 105 respectively. The main camshaft 50 carries a pinion 50a which meshes with a gear 45 of five times the pinion diameter. Gear 45 carries fast thereon a bank of five timing cams 101a to 105a which operate the respective switches 101 to 105. Each of these cams thus makes one revolution for each five machine cycles. Reference to the timing diagram of FIG. 13 shows that the platen controlling switch 103 is closed during most of the third cycle and during most of the fourth cycle of a sequence of five cycles. This permits the printing of the upper line of indicia on the first and fifth ticket sections of each ticket. When ticket sections other than the first and fifth are present at the upper line printing station when the bed rises to print there, the platen will be depressed because the solenoid 221 is deenergized. Likewise in any cycle in which the detector 218 does not detect ticket material the platen will also be depressed when the bed rises.

The other cam operated switches 101, 102, 104 and 105 will be discussed in connection with their several functions.

At its sixth position beyond the severing dies a ticket section lies in the punching station. This includes a stationary cross member 27 in which the punches 25 are vertically movable, selected punches being held down by interposer wheels 22 and caused to punch as the lower die 30a and upper die 31 move up and down with the bed.

The interposer wheels 22 carry gears 22a on their faces. The gears 22a of some of the interposer wheels preferably intermesh with manual setting mechanism such as disclosed in said patent and the gears 22a of for example five of the interposer wheels intermesh with idler gears 78 which, as in said applications, interconnect these interposer wheels with automatic setting-changing and numbering mechanism.

Those interposers which are manually settable can if desired be used to control punching in code the number which appears on the printing plate at the first printing station.

Those interposers that are interconnected to the automatic setting-changing and numbering mechanism will punch in code the ticket number which is printed upon the lower part of certain sections of the ticket.

As the bed moves up and down, vertical posts 57 which carry the upper stripper plate move up and down in bushings 58 in the punch holder member 27. The two vertical posts have their lower ends secured within two slide blocks 59 and 60 respectively which are laterally movable in channels cut from the bed. Thus the assemblage of upper and lower punch dies 31, 30a, punch holder 27 and bank of punches 25 can be shifted laterally. FIG. 14 shows the punches aligned with corresponding interposers so that the interposers are effective to control the punches. FIG. 16 shows the punches as shifted laterally to the left and having cleared the interposers and risen freely with the upstroke of the bed. The punches 36 and 38 for punching the locating holes similarly clear the stationary abutments that cause these punches to operate when the bank of punches is in the effective position of FIG. 14.

The assemblage carrying the punches is normally held in its left-hand or ineffective position by a spring 66 acting on a bell crank 67 which engages the block 59. A solenoid 68, when energized, acts on the bell crank in opposition to the spring to hold the assemblage of punches in the operative position shown in FIG. 14.

The solenoid is under the control of the cam operated switch 102 which operates in timed relation to the machine to cause the punches to be ineffective with respect to all except the first section of a ticket and cause the punches to be effective to punch that section. This section of the ticket arrives at the punch station in the first of the five cycles shown in the diagram of FIG. 13, during a considerable part of which the switch 102 is closed.

As in said applications the bed has two strokes per cycle, the first of which strokes is short as shown in the timing diagram. The shift of the punches to operative position occurs while the bed is down, before its second, longer, vertical stroke during which punching takes place.

As in said Bone application, the punching station carries a normally open microswitch 150, controlled by a plunger 151, which extends upwardly from a feeler element 152 adapted to rest on the lower die element 30a and slidable vertically within the upper die element 31. Introduction of the ticket material into the punching station closes this microswitch. As in the machine of said Bone application, a principal function of the microswitch 150 is to control a circuit which prevents inking of the number wheels and automatic change of setting of the number wheels and interposers in any cycle in which no ticket section is in position to enter the numbering station at the next feed stroke.

Figure 2:
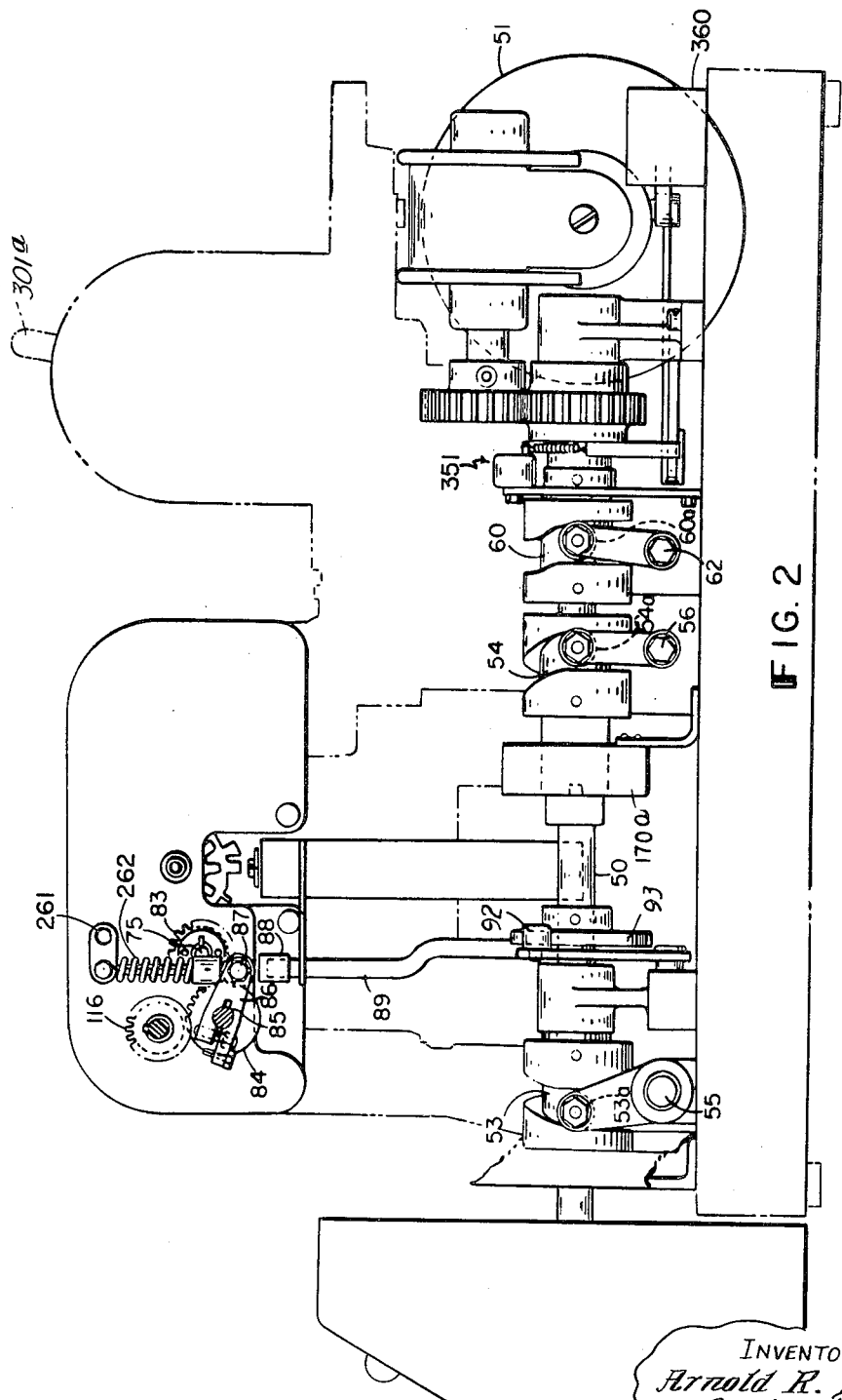
FIG. 2 is a right side elevation of the machine, partly in outline and omitting various parts.

The numbering and automatic setting-changing mechanisms utilize construction shown in said applications. Thus, the numbering device comprises a bank of five numbering print wheels 70, each carrying 0 and the digits 1 to 9 and having on its side face a ten tooth gear 70a fast thereon and intermeshing with a corresponding idler gear 78, the bank of whels 70 being freely rotatable upon a sleeve 71 which is carried by an arm 72 fast upon a rock shaft 75 upon which the idler gears 78 are freely rotatable. By swinging of the rock shaft 75 the numbering wheels are swung from their full line operative position to the broken line position where they are engageable with an ink roll 80 in the full line operative position of the latter. The swinging of the rock shaft 75 is accomplished as follows. As shown in FIG. 2 this shaft carries a gear 83 which is fast thereon and meshes with a gear 84 fast on a shaft 85 carrying a crank arm 86. This crank arm is raised from its position of FIG. 2 once each cycle by a plunger 89 operated by a bell crank 90 and cam follower 92 and cam 93 on the main shaft 50.

As mentioned, the microswitch 150 controls a circuit which prevents inking of the number wheels and automatic change of setting of the number wheels and their associated punch interposers after the last printing by the number wheels during a given run. The means for preventing inking and setting changing under these circumstances will however allow inking to occur notwithstanding that numbering of one or more following sections is to be omitted.

The machine could be set up so that setting change could also occur automatically notwithstanding that printing of the changed setting was to be suppressed in the cycle following the change. This would enable the ticket number to be omitted from the first section of the ticket of FIG. 3 if desired while leaving the print wheel properly indexed and inked with a changed setting for printing the number on any subsequent section, for example the fourth section as shown.

In the machine of the present invention the rock shaft 75 that carries the numbering wheels to inking position is provided with a collar 94 fast thereon and having a shoulder 94a as shown in FIG. 23. A pivoted latch 95 has a laterally extending end portion 95a adapted to detain this shoulder and prevent the group of numbering wheels from returning more than slightly toward their active printing position from their elevated inking position. The latch is slotted at 95b to receive a pin 97 carried by the movable arm 98 of a rotary solenoid 99. The solenoid when deenergized has its arm in the position shown in FIG. 23, but when energized this arm rotates in a counterclockwise position and the pin on this arm lifts the latch, releasing the collar. This release comes at a time when the plunger 89 of FIG. 2 is at the high point of its stroke, at which time the arm carrying the numbering wheels is slightly counterclockwise of its position shown in FIG. 23, so that the shoulder on the collar does not interfere with removal of the latch. The engagement of the latch with the collar in order to detain the numbering wheels in an elevated position, occurs at about the same point in a cycle.

As shown in the wiring diagram of FIG. 24b the solenoid 99 which controls the latch receives its current supply from a rectifier which in turn is under the control of a cam-operated switch 101. The printing or non-printing is thus controlled in timed relation to the machine. For printing the particular ticket of FIG. 3 the solenoid will be deenergized after the printing of the number on the first section of a ticket and reenergized in time for printing the number again on the fourth and fifth sections.

The ink roll 80 is swung into operative position by means such as shown and described in said Bone application, the only substantial change in this means being that the solenoid 96 is a rotary solenoid having a crank arm which operates a crank arm 82a fast on shaft 82 through a pin and slot connection. As in the Bone application, energization of this solenoid 96 holds the ink roll in operative position.

The ink roll 96 and also the solenoid 146 which controls the change in setting of the numbering wheels and their associated interposers as in the Bone application are controlled by the circuit of FIG. 24a. This circuit is similar to that of the Bone application in that the microswitch 150 controls a relay R–1a which controls the current supply to the solenoids 96 and 146. When a switch 160c is in the "Repeat" position as shown, the current supply to solenoid 146 is under the additional control of a relay R–2a whose contacts are normally open. Relay R–2a is energized by current from the secondary of a transformer 200, this current being under the joint control of a switch 170a closed once each cycle by a cam on the main camshaft 50, and of a control-hole sensing means at the lower line printing station. In the present machine this latter sensing means is a switch 201 which is generally similar to the previously mentioned sensing switch 40.

Switch 170a closes after the forward feed of the tickets and opens before the next forward feed. Switch 201 closes only when it encounters a control hole 203 or encounters no ticket material. In both these cases inking and setting changing occur provided ticket material is present at switch 150 at the preceding station. Since the current supply to solenoid 96 is independent of the switches 170a and 201 and relay R–2a, inking can occur in any cycle in which ticket material is present at switch 150. Thus, both inking of the numbering wheels and automatic change in setting are conditioned upon presence of ticket material at the punching station, and automatic change in setting is additionally conditioned upon presence of a fifth section or absence of ticket material, at the lower line printing station.

Another alternate circuit adapted to control the inking and setting-changing solenoids 96 and 146 is shown in FIG. 16 of the U.S. patent application of Donald D. Sloan and Alan M. Swett, Serial No. 740,342, filed June 6, 1958.

The setting-changing mechanism which is substantially like that of the Bone application includes five index gears 100 for units, tens, hundreds, thousands and ten-thousands respectively, rotatable on a shaft 101 and each consisting of a ten toothed gear meshing with one of the idler gears 78 and carrying the characters "0" through "9" which are visible to the operator. Each such toothed gear wheel 100 has fastened thereto a smaller diameter toothed drive ring 102 having nine shallow notches 103, FIG. 18, and one deep notch 106.

A stepped drive pawl 110 is fast upon a shaft 114 which is journaled in the side plates 113 of a pawl carrier 112 and is rocked with the carrier 112 about shaft 101. The pawl carrier 112 is secured to a rotatable sleeve 115, FIG. 19, having fast thereon a gear 116 which meshes with the gear 84 on the rock shaft 85. At each cycle the pawl carrier is rocked from its full line position of FIG. 18 to its broken line position. By engagement of the stepped pawl 110 with one or more of the drive rings 102, rocking of the pawl results in the setting of the index gears 100 being advanced one unit, correspondingly advancing the setting of the numbering print wheels and their associated interposers.

This change in the setting of the print wheels and interposers takes place during the rocking of the numbering print wheels to inking position, and the type characters for printing the changed number receive ink.

The stepped drive pawl 110 has five prongs for engagement with the respective drive rings 102 of the five index gears 100, the longest prong 118a engaging the units' index gear drive ring.

The engagement of a prong of the stepped drive pawl with any given drive ring prevents engagement of the pawl with the drive rings of any higher order index gear excepting in the case when the driving engagement with the given drive ring is in the deep notch 106 thereof. In this latter case the pawl is able to engage the drive ring of the index gear of the next higher order and drive that index gear also, the pawl thus performing the function of a carry-over device.

Other forms of counting means could be substituted.

Referring to FIG. 17 a stop or locking pawl 120, pivoted on a stationary rod 120a between side plates 119, 119 is operated by a cam 121, FIG. 18, which rocks with the pawl carrier 112 and a cam follower arm 122 which rides on the cam 121, the stop or locking pawl being urged by a spring 124 toward its unlocked position. This pawl prevents over-running of any of the index wheels as they are driven by drive pawl 110. The stop pawl 120 is five-pronged so as to reach in beside the five gears 100 and engage their respective drive rings 102, as in the broken-line position of the pawl in FIG. 18.

Detent pawls 130 for the several drive rings are pivotally supported at 130a and are spring urged by springs 131 into the notches of the respective drive rings and releasably hold them in indexed position.

Accurate indexing of the numbering interposers 22 is assured by provision of a five-pronged locking comb 260, FIGS. 19 to 21. This comb is fast on a shaft 261 which is rocked through a yieldable connection 262 by the upward movement of roller 87 at each cycle. The five prongs of comb 260 seat between the teeth of the gears 22a of the interposers, accurately index these wheels and hold them in indexed position as shown in FIG. 21 during the operation of the punches.

As indicated in FIG. 18, each drive ring 102 carries in a recess therein a spring pressed plunger 138, and shaft 101 is suitably recessed to receive these plungers. Thus one revolution of shaft 101 clockwise in FIG. 18 will carry any of the drive rings and their index gears which are not already in zero position forwardly into zero position, leaving the whole bank of wheels in their zero settings.

The drive pawl 110 is rocked at each cycle, but is ineffective when not allowed to engage with any of the drive rings 102. Referring to FIGS. 22 and 23, the shaft 114 on which the drive pawl 110 is fast carries a follower arm 140 adapted to be engaged by a stop pin 141 carried by an arm 141a rotatable by the movable armature of the solenoid 146. A spring 148, FIG. 22, yieldingly urges the pawl 110 and arm 140 downwardly but when the solenoid 146 is de-energized the pin 141 prevents such downward movement and the drive pawl 110 clears all of the drive rings 102 and no change in setting is made. Energization of the solenoid 146 withdraws pin 141 from engagement with the follower arm 140 and allows the drive pawl 110 to engage one or more drive rings to advance the setting by one digit.

It has been explained above how the upper line printing, the lower line printing and the punching are each suppressed in certain cycles by the respective cam operated switches 103, 101 and 102 and how the severing of the strip results from detection by switch 40 of a control hole 203 at the first position beyond the severing dies.

The machine will normally and automatically stop at the end of some cycle which is a multiple of five, and so be in the proper condition to start a new run.

Stopping at the end of a run is brought about by the counter 250 raising the strip lifting elements 293 and throwing the switch 307 to OFF position as in the device of said Patent No. 2,890,650. The raising of the strip lifting elements occurs when the predetermined count is attained, corresponding to a zero setting of the counter. The counter then continues to count once in each further cycle, beyond zero setting, because at each such further cycle there is no ticket material at the sensing switch 40 and this switch is accordingly closed. The counter is arranged to throw switch 307 to OFF in the tenth such further cycle. Thus the machine normally stops in proper phase.

However, the machine can be stopped in various ways at the end of any cycle, and conceivably it might not be restarted with the same strip. Therefore, to insure that the machine cannot be operated out-of-phase with respect to the ticket strip, two further precautions are taken.

First, a visual signal light 270 (FIG. 24b) indicates the completion of the fifth cycle of a sequence of five cycles. This light is energized by the cam operated switch 104 well along in the fifth cycle and is extinguished early in the following first cycle. Thus when the machine has stopped at the end of the fifth cycle, as intended, the light will remain lit and show this fact. If not lit at the start of an operation, the operator should operate the machine, cycle by cycle, without ticket material, until at the end of a cycle the light is lit. The machine can be advanced cycle by cycle by holding the detector 310 depressed and moving the starting handle 301a quickly back and forth. (FIGS. 1 and 2; also FIG. 27 of Patent No. 2,890,650.)

With the light 270 lit, the operator will place the leading edge of a ticket strip at the severing dies. Because no ticket material is present at switch 40, switch 40 will be closed, but at the first step of feed will be opened by the first ticket section and the severing dies will not operate until five ticket sections have passed and a control hole 203 is presented to the switch. The various operations of printing and punching will then be performed in the proper sequence on the proper sections.

Secondly, the machine is automatically stopped if through inadvertence it is started out-of-phase with respect to the material.

It will be seen that operating coil 371 of switch 370 is under the joint control of a cam operated switch 105 and the lower contacts of switch 42. Switch 42 is open when any ticket section having no control hole 203 is present at the sensing switch 40. During all of the time except for a short part of each fifth cycle, switch 105 is closed. In this short part of the fifth cycle, when switch 105 is open, a ticket section having a control hole should be present at switch 40 and the switch 42 accordingly closed. During this time the lower contacts of switch 42 establish an alternate circuit to maintain coil 371 energized. If a section having no control hole keeps switch 40 open at this moment, the alternate circuit is not established, coil 371 is de-energized, switch 370 opens, clutch solenoid 360 is de-energized and the machine stops.

Absence of ticket material at switch 40, as when the machine is clearing at the end of a run, does not stop the machine because switch 40 closes upon the absence of an entire ticket section as well as upon presence of a control hole.

The checking circuit not only stops the machine if for any reason the material is out-of-phase with the intended pattern of location of the indicia, but more specifically the checking circuit gives the operator warning as early as the fifth cycle in case the machine has been started with the material improperly threaded. An example of improper threading would be the placing of the leading edge of a new ticket strip at the wrong location in starting up. It will be seen that the automatic stopping of the machine occurs before the first ticket section reaches the sensing switch 150 at the punching station. Accordingly, automatic setting change and inking of the number wheels cannot take place when the checking circuit detects out-of-phase relation. In other words, the fault is detected before the ticket is able to affect consecutive advance of the numbering wheels and their associated punches.

The checking circuit not only guards against such out-of-phase operation which might be due to an error by the operator, but also affords a check upon the correctness of the spacing and the control holes 203.

If any fifth ticket section should lack a control hole, the setting changing mechanism would not be advanced, and in the absence of the checking circuit, a duplicated ticket would be made. This is guarded against by the checking circuit, which immediately stops the machine in case a control hole (or absence of ticket material) is not sensed at each fifth cycle. The machine thus in effect rejects any ticket material which is not provided with a control hole at each fifth ticket section.

In a machine in which the count depends upon the tickets having control or sensing holes the absence of such a hole would normally cause a miscount. This again is guarded against by the checking circuit which stops the machine before the miscount can be made.

Even in a machine where the sensing of a control hole controls the severing of tickets from the strip and the counting of the tickets, absence or ineffectiveness of even a single control hole would be likely to cause a jam in whatever automatic ticket stacker receives the tickets, because the absence of this hole would cause the ticket to be of double length, so that it would not fit in the stacker. Such formation of a double length ticket is prevented by the checking circuit.

While, by way of example, the ticket has been shown as a five section ticket, and the machine has been shown as arranged to operate with a recurring sequence of five cycles appropriate to such five section ticket, the ticket may have a greater or lesser number of sections and the recurrring sequence of cycles may consist of a correspondingly greater or lesser number of cycles.

While the cut-out which is detected and causes the switches 40 and 201 to close is shown as a small round prepunched hole 203 interior of the margins of the ticket, other sizes, shapes and locations of cut-outs may be used for the same purpose.

I claim:

1. An indicia-applying machine for sectional ticket material, the machine including a plurality of indicia-applying devices at respective stations, means for feeding the ticket material step by step in successive cycles, timing means for causing the operation of one of said devices in the cycles of certain steps of feed and non-operation thereof in other cycles, the cycles of operation and non-operation forming a recurring sequence, and means for stopping the operations of feeding and indicia-applying in the event of out-of-phase relation between the ticket material and the recurring sequence of cycles of operation and non-operation, the machine including two controlling means for said stopping means, one of said controlling means including a detector for a cut-out occurring in a particular section of the material of a ticket and the other controlling means including switching means operating in timed relation to the recurring sequence of cycles of operation and non-operation, said detecting means and said switching means each having two respective conditions, the stopping means being under the joint control of the two controlling means, the two controlling means cooperating to cause said stopping when the switching means has a certain one of its two conditions and coincidentally the detector has a certain one of its two conditions.

2. An indicia-applying machine for sectional ticket material, the machine including a plurality of indicia-applying devices at respective stations, means for feeding the ticket material step by step in successive cycles, timing means for causing the operation of one of said devices in the cycles of certain steps of feed and non-operation thereof in other cycles, the cycles of operation and non-operation forming a recurring sequence, a clutch controlling the operations of feeding and indicia-applying, electromagnetic means controlling the clutch, switching means operating in timed relation to the feed and effective to maintain said electromagnetic means energized but ineffective to maintain said electromagnetic means energized during a period within such sequence of cycles, detecting means responsive to a cut-out occurring in a ticket section and similarly responsive in the case of absence of a ticket section, and a circuit whereby response of the detecting means either in the event of a cut-out or absence of a ticket section is effective to maintain said electromagnetic means energized during periods of ineffectiveness of said switching means.

3. In an indicia-applying machine for sectional tickets, the combination of step-by-step ticket feeding means, indicia-applying means having changeable settings, means for automatically changing the setting of the indicia-applying means, timing means for suppressing operation of said indicia-applying means in certain cycles so that the cycles of operation and of non-operation form a sequence which recurs for successive tickets, the operation of the setting-changing means at the beginning of the run being conditioned upon the presentation of the leading section of the first ticket at a predetermined place, the machine including means for detecting ticket material at said place and preventing the setting change in the absence of ticket material, a detector responsive to a cut-out occurring in a ticket section, timing means operating in timed relation with the suppressing means, stop means for stopping the feed, said stop means being under the control of the timing means except during a portion of a cycle and then being under control of the cut-out detector, said cut-out detector being at a number of steps in advance of the ticket material detector so that as the ticket material approaches said material detector step by step, a period of control by the cut-out detector arrives before the cycle in which a leading ticket section advances past the cut-out detector and arrives at the material detector, and out-of-phase relation between the initial ticket and the pattern of suppression of indicia application established by the timing means results in stoppage of the feed without automatic change in setting.

4. An indicia-applying machine for sectional ticket material including step-by-step feeding means for the ticket material, interconnected printing and punching devices having changeable settings, means for automatically changing the settings of the printing and punching devices, means at a predetermined place in the path of ticket feed for detecting a cut-out in a ticket section or absence of a ticket section at said place, said detecting means controlling the setting changing means, means for withholding operation of at least one of said devices during a predetermined cycle of a sequence of cycles of operations of the machine, further detecting means for detecting the same cut-out in a ticket section or absence of a ticket section, and means for stopping operation of the printing and punching devices, said further detecting means controlling said stopping means.

5. In an indicia-applying machine for sectional tickets, the combination of step-by-step ticket feeding means, indicia-applying means, timing means for suppressing operation of said indicia-applying means in certain cycles so that the cycles of operation and of non-operation form a sequence which recurs for successive tickets, said sequence comprising a predetermined number of cycles corresponding to the number of sections per ticket, a signal light, and means controlling the signal light to cause the light to be lit at the end of a given cycle and the ends of those cycles separated from said given cycle by said predetermined number of cycles and multiples of said number, and not be lit at the end of any intervening cycle.

6. An indicia-applying machine as claimed in claim 1 in which the indicia-applying device whose operation and non-operation is caused by the timing means is a printing device.

7. An indicia-applying machine as claimed in claim 1 in which the indicia-applying device whose operation and non-operation is caused by the timing means is a punching device.

References Cited in the file of this patent

UNITED STATES PATENTS

| | | |
|---|---|---|
| 998,623 | Lundgren | July 25, 1911 |
| 1,626,217 | Tausehek | Apr. 26, 1927 |
| 2,050,745 | Woodruff | Aug. 11, 1936 |
| 2,177,788 | Ross | Oct. 31, 1939 |
| 2,427,602 | Helsel | Sept. 16, 1947 |
| 2,511,670 | Gollwitzer | June 13, 1950 |
| 2,708,873 | Braun | May 24, 1955 |
| 2,768,691 | Cooper et al. | Oct. 30, 1956 |
| 2,890,650 | Bone et al. | June 16, 1959 |
| 2,968,236 | Swett | Jan. 17, 1961 |